(12) United States Patent
Shivashankara et al.

(10) Patent No.: US 9,638,176 B2
(45) Date of Patent: May 2, 2017

(54) VORTEX GENERATOR USING SHAPE MEMORY ALLOYS

(71) Applicant: The Boeing Company, Chicago, IL (US)

(72) Inventors: Belur N. Shivashankara, Bellevue, WA (US); James H. Mabe, Seattle, WA (US); Dan J. Clingman, Milton, WA (US)

(73) Assignee: The Boeing Company, Chicago, IL (US)

( * ) Notice: Subject to any disclaimer, the term of this patent is extended or adjusted under 35 U.S.C. 154(b) by 829 days.

(21) Appl. No.: 13/891,769

(22) Filed: May 10, 2013

(65) Prior Publication Data

US 2014/0331665 A1    Nov. 13, 2014

(51) Int. Cl.
| | | |
|---|---|---|
| *F03G 7/06* | (2006.01) | |
| *B64C 9/32* | (2006.01) | |
| *B64C 23/06* | (2006.01) | |

(52) U.S. Cl.
CPC ............ *F03G 7/065* (2013.01); *B64C 9/32* (2013.01); *B64C 23/06* (2013.01); *Y02T 50/162* (2013.01); *Y10T 29/49002* (2015.01)

(58) Field of Classification Search
CPC . F03G 7/065; B64C 23/06; F02K 1/38; F01D 5/18
See application file for complete search history.

(56) References Cited

U.S. PATENT DOCUMENTS

| | | | |
|---|---|---|---|
| 5,127,228 A | 7/1992 | Swenson | |
| 6,427,948 B1 | 8/2002 | Campbell | |
| 6,718,752 B2 | 4/2004 | Nesbitt et al. | |
| 7,037,076 B2 | 5/2006 | Jacot et al. | |
| 7,753,316 B2 | 7/2010 | Larssen et al. | |
| 7,878,457 B2 | 2/2011 | Narramore | |
| 7,878,459 B2 | 2/2011 | Mabe et al. | |
| 8,038,396 B2 | 10/2011 | Anjuri et al. | |
| 8,061,986 B2 | 11/2011 | Xiong | |
| 8,087,617 B2 | 1/2012 | Sclafani et al. | |
| 8,186,143 B3 | 5/2012 | Wood et al. | |
| 8,256,720 B2 | 9/2012 | Ikeda | |
| 2005/0198777 A1 | 9/2005 | Mabe | |
| 2008/0265102 A1 | 10/2008 | Larssen et al. | |

(Continued)

FOREIGN PATENT DOCUMENTS

EP          1896323          6/2009

OTHER PUBLICATIONS

Search Report and Opinion, European Application No. 14167782.3 (Jul. 22, 2014).

(Continued)

*Primary Examiner* — Mark A Laurenzi
*Assistant Examiner* — Shafiq Mian
(74) *Attorney, Agent, or Firm* — Thompson Hine LLP

(57) ABSTRACT

In one embodiment, the disclosed vortex generator may include a flap, a bearing configured to be mounted on a surface, an axle retained in the bearing, the flap attached to the axle such that the flap rotates relative to the bearing about the axle, and an actuator made of a shape memory alloy attached to the flap and to a support, the actuator shaped to receive the axle therethrough, such that a change in temperature of the actuator causes the actuator to rotate the flap relative to the bearing.

20 Claims, 3 Drawing Sheets

(56) References Cited

U.S. PATENT DOCUMENTS

2009/0212158 A1* 8/2009 Mabe .................. B64C 9/32
 244/1 N
2010/0038492 A1 2/2010 Sclafani
2012/0292155 A1 11/2012 Gunter

OTHER PUBLICATIONS

Mabe, J.H. et al., "NiTinol Performance Characterization and Rotary Actuator Design," Proc. of SPIE, vol. 5388, pp. 95-109 (2004).
CA, Office Action; Canadian Patent Application No. 2,845,155 (Mar. 26, 2015).
CA, Office Action; Canadian Patent Application No. 2,845,155 (Feb. 11, 2016).

* cited by examiner

VORTEX GENERATOR USING SHAPE MEMORY ALLOYS

FIELD

This disclosure relates to vortex generators and, more particularly, to deployable vortex generators mounted on aerodynamic surfaces.

BACKGROUND

A vortex generator typically consists of a small vane or flap that may be mounted on an aerodynamic surface to create a vortex in air flowing over the surface. Vortex generators may be used on many devices, but are used most commonly on the nacelles, fuselages, and aerodynamic wing surfaces of aircraft. When so placed on an aerodynamic surface, vortex generators delay flow separation and aerodynamic stalling, thereby improving the effectiveness of wings and control surfaces. In one particular application, vortex generators may be spaced along the front third of a wing surface in order to maintain steady airflow over the control surfaces at the trailing edge of the wing.

Vortex generators may be generally rectangular or triangular in shape and are mounted to extend substantially perpendicular to the surface on which they are mounted. Typically, vortex generators may be shaped to extend from the aerodynamic surface to about 80% as high as the boundary layer of air passing over the surface and extend span-wise near the thickest part of an aircraft wing. When mounted on an aircraft wing, vortex generators typically are positioned obliquely relative to the span of the wing so that they have an angle of attack with respect to local air flow.

Vortex generators typically are most needed during low speed, low-altitude flight, such as during take-off and landing. In other applications, they may be needed only during high-speed, high-altitude cruise. Since vortex generators typically are fixed vane devices, they remain deployed at all times during flight. This may result in unnecessary extra drag and resultant increase in fuel consumption.

In response to the negative effects of vortex generators during cruise, deployable vortex generators have been developed in which the aerodynamic surface or flap of the generator is deployed only during take-off, landing and other low speed operation, and is otherwise stowed and removed from exposure to air flow during cruise. Accordingly, there is a need for a vortex generator that may be actuated between stowed and deployed positions with a minimum of cost and structure.

SUMMARY

In one embodiment, the disclosed vortex generator may include a flap, a bearing configured to be mounted on a surface, an axle retained in the bearing, the flap attached to the axle such that the flap rotates relative to the bearing about the axle, and an actuator made of a shape memory alloy attached to the flap and to a support, the actuator shaped to receive the axle therethrough, such that a change in temperature of the actuator causes the actuator to rotate the flap relative to the bearing.

In another embodiment, a vortex generator may include a frame configured to be mounted on an aerodynamic surface, a forward bearing mounted on the frame, a rearward bearing mounted on the frame, an axle rotatably attached to the forward and rearward bearings, a flap having a leading edge and a trailing edge, the flap including a forward sleeve attached to the axle and a rearward sleeve attached to the axle such that the flap rotates relative to the forward and rearward bearings, and an actuator made of a shape memory alloy and configured to receive the axle therethrough, the actuator being attached to the axle and to the rearward bearing, such that a change in temperature of the actuator causes the actuator to rotate the flap about the axle from a stowed position, wherein the flap is parallel to the frame, to a deployed position, wherein the flap is not parallel to the frame, and an opposite change in temperature of the actuator causes the actuator to rotate the flap from the deployed position to the stowed position.

In yet another embodiment, a method for deploying a vortex generator including a flap may include mounting a bearing on an aerodynamic surface, attaching an axle to the bearing and to the flap such that the flap rotates relative to the bearing about the axle, attaching an actuator made of a shape memory alloy to the flap and to the bearing, and elevating the aerodynamic surface to an altitude wherein a temperature of the actuator decreases so that the actuator rotates the flap to one of a parallel position relative to the aerodynamic surface and a non-parallel position relative to the aerodynamic surface.

Other objects and advantages of the disclosed vortex generator will be apparent from the following description, the accompanying drawings and the appended claims.

DETAILED DESCRIPTION

Figure 1:
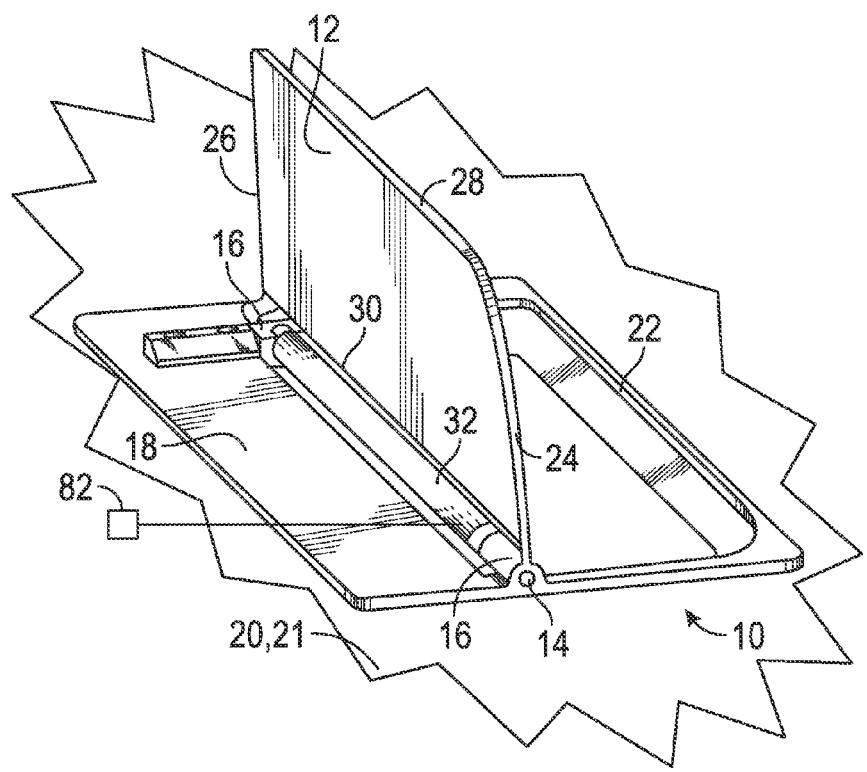
FIG. 1 is a perspective view of the disclosed vortex generator using shape memory alloys, in which the vortex generator is in a deployed position.
Figure 2:
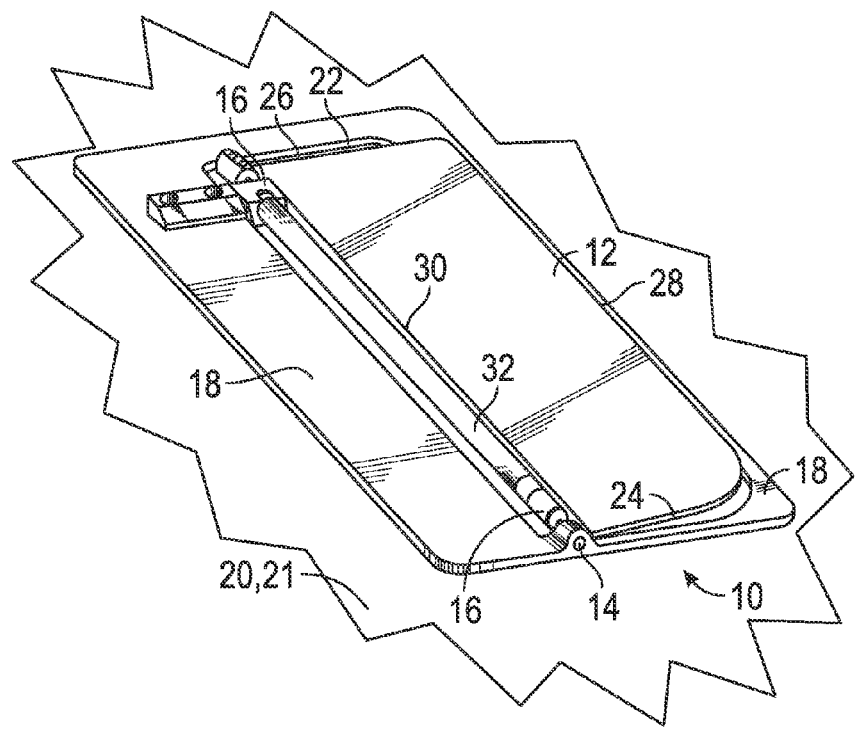
FIG. 2 is a perspective view of the vortex generator of FIG. 1, in which the vortex generator is shown in a stowed position.
Figure 3:
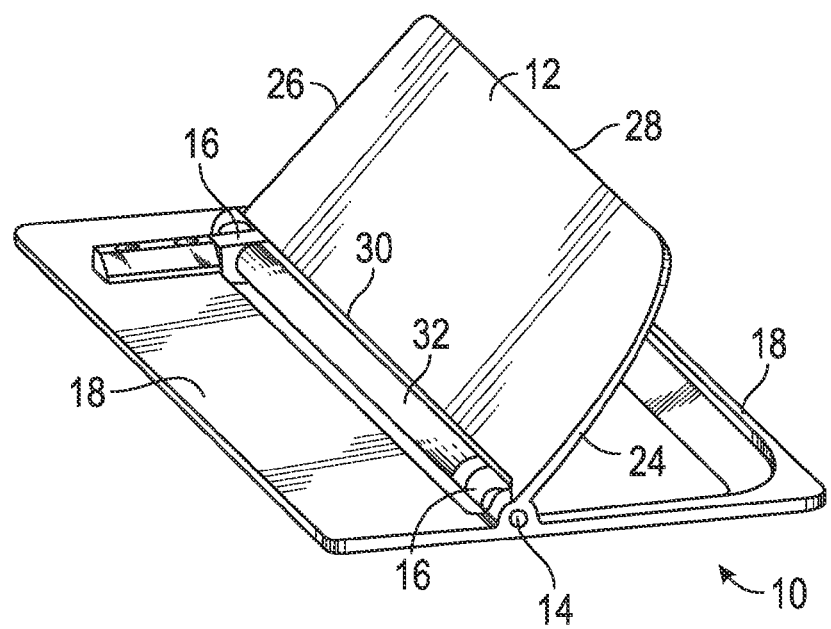
FIG. 3 is a perspective view of the vortex generator of FIG. 1, in which the vortex generator is shown partially deployed.

As shown in FIGS. 1-3, the disclosed vortex generator, generally designated 10, may include a flap 12 that is attached to an axle 14. The axle 14 may be retained in a bearing, generally designated 16, that, in turn, may be mounted on a surface, which in the embodiment of FIGS. 1-3 may be a frame 18. The flap 12 may rotate relative to the bearing 16 with the axle 14. The frame 18 may be mounted on an aerodynamic surface 20 of a vehicle 21. The frame 18 may include an opening 22 shaped to receive the flap 12. In an embodiment, the frame 18 may be unitary with, and consist of a portion of, the aerodynamic surface 20 of the vehicle 21. In embodiments, the vehicle 21 may be an aircraft, a spacecraft reentry vehicle, a marine vehicle and/or a land vehicle.

The flap 12 may include a leading edge 24, a trailing edge 26, an outer edge 28, and an inner edge 30. The flap may be made of the same material, such as aircraft aluminum alloy, and have the same thickness as the frame 18. In an embodiment, the flap 12 may be shaped such that the distance between the outer edge 28 and inner edge 30 approximates the height of a boundary layer of air passing over the surface 20. In other embodiments, the flap 12 may be shaped such that the distance between the outer edge 28 and the inner edge 30 may be less than a height of a boundary layer flowing over the surface 20, for example 80% of that height, or greater than a height of a boundary layer flowing over the surface 20. The flap 12 may be oriented on the vehicle 21 such that the leading edge 24 encounters air flowing over the surface 20 in forward vehicle motion and is upstream of the trailing edge 24. The flap 12 may be positioned obliquely to airflow on the surface 20.

The flap 12 may be generally planar in shape, and rectangular. In embodiments, the flap may be arcuate in shape, such as to conform to the curvature of the adjacent surface 20. The leading edge 24 may be substantially straight, or in the embodiment shown may extend perpendicularly from the axle 14 and gradually curve rearward to the outer edge 26. The flap 12 may be shaped to pivot with axle 14 about bearing 16 between a deployed position shown in FIG. 1, in which the flap is perpendicular, or substantially perpendicular, to the frame 18 and aerodynamic surface 20, and a stowed position shown in FIG. 2, in which the flap rests within the opening 22 of the frame and is parallel, or substantially parallel, to the frame.

Figure 4:
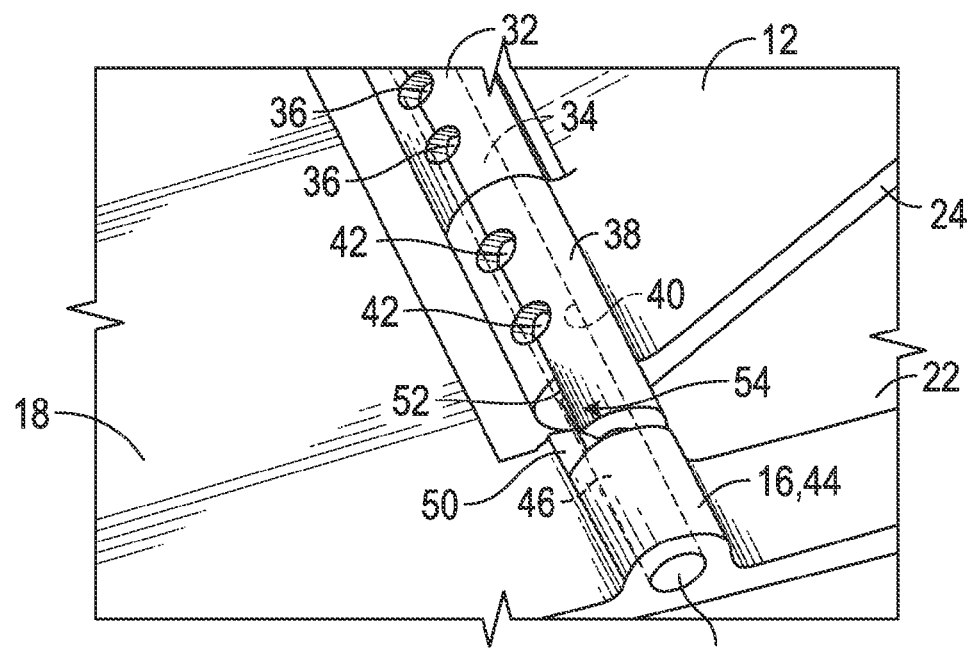
FIG. 4 is a detail of the vortex generator of FIG. 2, showing the forward bearing.

The vortex generator 10 may include an actuator, generally designated 32, made of shape memory alloy ("SMA"). The shape memory alloy may be alloys of copper-aluminum-nickel, nickel-titanium, and zinc-copper-gold-iron. As shown in FIG. 4, the actuator 32 may be in the form of a tube or sleeve having a central bore 34 shaped to receive the cylindrical axle 14 therethrough. The bore 34 may be cylindrical in shape, or in embodiments may have a polygonal shape in cross section, such as a hexagonal shape. In an embodiment, the portion of the axle 14 that extends through the bore 34 may have a complementary polygonal shape in cross section. The actuator also may include set screws 36 that fix the actuator 32 relative to the axle 14, so that rotation of the actuator 32 may cause the axle 14 to rotate relative to the bearing 16.

In an embodiment, the flap 12 may include a forward sleeve 38 extending from the inner edge 30. The forward sleeve may have a bore 40 therethrough shaped to receive the axle 14. The forward sleeve 38 may include set screws 42 that attach and fix the forward sleeve to the axle, so that rotation of the axle 14 causes the forward sleeve 38, and hence the flap 12, to rotate relative to the bearing 16 and frame 18.

Also as shown in FIG. 4, the bearing 16 may include a first or forward journal bearing 44, which in an embodiment may be formed integrally with the frame 18. Bearing 44 may have a bore 46 therethrough that receives a forward portion 48 of the axle 14. The forward bearing 44 may include a first bearing surface in the form of a flat 50 that is shaped and positioned to engage a correspondingly shaped second bearing surface in the form of a flat 52 formed on the forward sleeve 38. The flats 50, 52 may cooperate to act as a stop 54 that limits rotation of the flap 12 relative to the frame 18 and aerodynamic surface 20 (FIGS. 1-3) to a preset deployed position.

Figure 5:
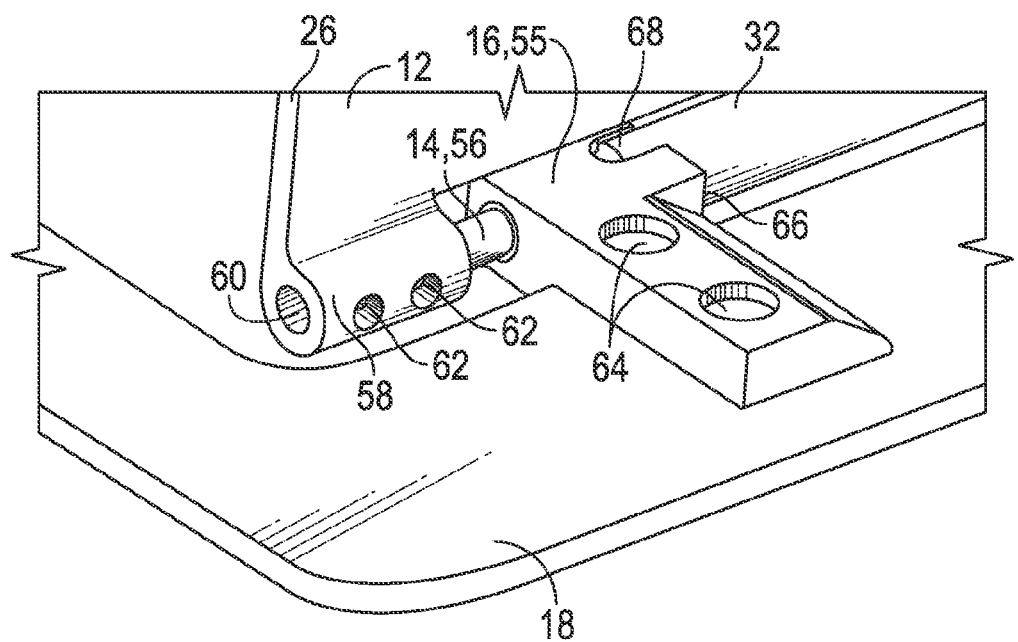
FIG. 5 is a detail of the vortex generator of FIG. 1, showing the rearward bearing.

As shown in FIG. 5, the bearing 16 may include a second or rearward journal bearing 55 that rotatably receives a rearward portion 56 of the axle 14. The flap 12 may include a rearward sleeve 58 extending from the inner edge 30. The sleeve 58 may have a bore 60 shaped to receive the rearward portion 56 of the axle 14. The rearward sleeve 58 may include set screws 62 that attach and fix the rearward sleeve to the rearward portion 56 of the axle 14, so that the flap 12 rotates with rotation of the axle 14 at the trailing edge 26. The rearward bearing 55 may be attached to the frame 18 by screws 64, or in embodiments, may be formed integrally with the frame 18, or may be attached by other means such as adhesives, welding and brazing. In the embodiment shown, axle 14 may be a continuous rod. In other embodiments, axle 14 may be segmented and consist of only a forward component or portion 48 (FIG. 4) and a rearward component or portion 56. In such an embodiment, the forward and rearward components 48, 56 may be of sufficient length to extend through at least the forward and rearward sleeves 38, 58, and the forward and rearward bearings 44, 55, respectively. In still other embodiments, the components 48, 56 may be of sufficient length to extend into the ends of the bore 34 of the actuator 32.

The rearward bearing 55 may include bosses 66 that receive and engage a complementarily shaped end 68 of the actuator 32. The end 68 of the actuator 32 may be secured to the bosses 66 by adhesive, or may be attached by screws or brazed or welded. In an embodiment, the engagement of the actuator 32 with the rearward bearing 55 may be effected by capturing the actuator on the axle 14 between the rearward bearing and the forward sleeve 38, or as shown in FIG. 4, by fixing the actuator on the axle at a forward end by set screws 36. The actuator 32 thus may be fixed relative to the rearward bearing 55 so that rotation of the actuator 32 may be constrained to rotate and apply torque to the axle 14 when actuated, because of the attachment of the actuator to the axle 14 by way of set screws 36 (FIG. 4).

Figure 6:
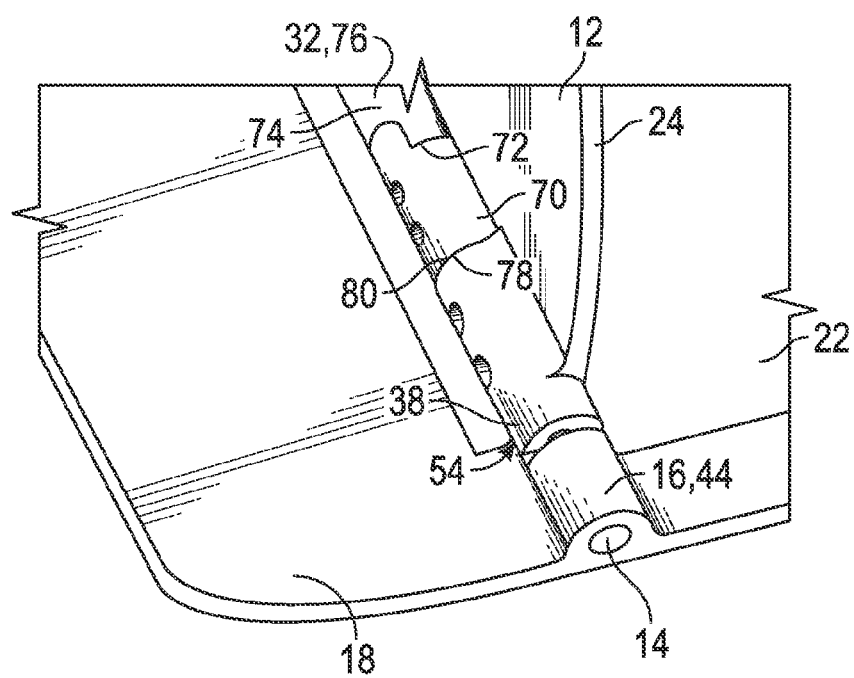
FIG. 6 is a detail of the vortex generator of FIG. 1, showing the forward bearing.

As shown in FIG. 6, the forward end of the actuator 32 may include an adapter sleeve 70 that may not be made of shape memory alloy. The adapter sleeve 70 may be made of aluminum or other metal, or of a polymer, or of carbon fiber. In one embodiment, the adapter sleeve 70 may have an eccentrically shaped end 72 that engages a complementarily shaped end 74 of the shape memory alloy component 76 of the actuator 32 and thus may prevent relative rotation of the shape memory component and adapter sleeve. This engagement may be fixed by adhesives, welding or other well-known means. Similarly, the forward end 78 of the actuator sleeve 70 may be eccentrically shaped and engage a correspondingly shaped surface 80 formed on the forward sleeve 38 of the flap 12. Thus, rotational motion of the actuator 76 may be transmitted directly to the flap 12 through the forward sleeve 38. In embodiments, such a direct connection may not be necessary because both the actuator 32 and the forward sleeve 38 of the flap 12 may be attached and fixed to the forward portion 48 of the axle 14 such that rotational motion of the actuator may be transmitted to the forward sleeve 38 of the flap through the forward portion of the axle.

The operation of the vortex generator may be as follows. As shown in FIG. 1, the frame 18 may be mounted on an aerodynamic surface 20 of a vehicle 21, which surface may be the wing surface of an aircraft, or other aerodynamic surface, such as the surface of a nacelle, fuselage or vertical stabilizer. Alternatively, the aerodynamic surface may be on a land vehicle, such as an automobile, a marine vehicle, or a spacecraft re-entry vehicle that is part of a spacecraft. The frame 18 may be attached to the surface 20 by rivets (not shown), by an adhesive, or by brazing or welding. The frame 18 also may be unitary with the surface 20.

The shape memory alloy component 76 (FIG. 6) of the actuator 32 may be selected and configured, as by annealing and/or selection of metal composition of the SMA, such that at ambient temperature at or near sea level, or at relatively low altitudes (e.g., under 10,000 feet), the SMA actuator 32 may be heated by ambient air so that its temperature increases. This increase in temperature of the SMA actuator 32 may cause the actuator to twist against the rearward bearing 55, thereby twisting the axle 14 relative to the bearing 16 and frame 18. This torsional force may cause the flap 12 to rotate counterclockwise to a deployed position, as shown in FIG. 1, from a stowed position as shown in FIG. 2. The flap 12 thus may be rotated relative to the bearing 16 to the deployed position to act as a vortex generator for the vehicle 21 during takeoff and landing, and during low altitude climb and descent. In an embodiment, the SMA actuator 32 may be selected to rotate the flap 12 to a preset orientation, and in an embodiment, this preset orientation may be determined by the geometry of the stop 54.

In an alternate embodiment, the shape memory alloy component 76 of the actuator 32 may be selected and configured, as by annealing and/or selection of metal composition of the SMA, such that a relatively high altitude (e.g., at or above 10,000 feet) the SMA actuator 32 may be cooled by ambient air so that its temperature decreases relative to its temperature in ambient air at a relatively low altitude (e.g., below 10,000 feet). This decrease in temperature of the SMA actuator 32 may cause the actuator to twist against the rearward bearing 55, thereby twisting the axle 14 relative to the bearing 16 and frame 18, which torsional force may cause the flap 12 to rotate counterclockwise from the stowed position shown in FIG. 2 to the deployed position shown in FIG. 1. In an embodiment, this deployed position may be a preset position determined by selection and configuration of the SMA actuator 32, and in other embodiments may be determined by the geometry of the stop 54. Thus, by material selection and/or configuration of the SMA of the component 76, the flap 12 may be rotated from the stowed position to the deployed position either when temperature decreases, as with an increase in altitude of the vehicle 21, or when the temperature increases, as with a decrease in altitude of the vehicle.

In an embodiment, the flap 12 may be perpendicular, or substantially perpendicular, to the frame 18 and/or aerodynamic surface 20 when rotated to the preset deployed position. As shown in FIG. 6, in this position the stop 54 (see also FIGS. 4 and 6) may prevent further rotational movement of the flap 12 relative to the frame 18, so that the flap 12 is at a preset deployed position determined by the position of the stop.

In an embodiment, as shown in FIG. 3, the actuator 32 and/or stop 54 may be selected and/or configured such that the shape memory alloy component 76 rotates the flap 12 to a preset deployed position that is a non-parallel, non-perpendicular angle, such as 45 degrees, relative to the frame 18.

In an embodiment, as shown in FIG. 1, rather than rely on heating of the shape memory alloy component 76 from ambient air to increase the temperature of the actuator 32, the vehicle 21 may include a heating device, generally designated 82 (FIG. 1), that may be connected to heat the shape memory alloy component 76 electrically by Joule heat. In another embodiment, the heating device 82 may constitute a blower or duct from an engine (not shown) of the vehicle 21 for directing heated air upon the shape memory alloy component 76.

When the vehicle 21 and surface 20 are elevated to a pre-set altitude, for example above 10,000 feet above sea level, the decrease in ambient temperature may cause a decrease in the temperature of the actuator 32, causing the actuator to rotate in a clockwise direction as shown in FIGS. 1 and 3. In an embodiment, this decrease in temperature of the actuator 32 may result from deactivating the heating device 82. This counter-rotation, which may result from cooling or a reduction in temperature of the shape memory alloy component 76 (FIG. 6) of the actuator 32, may cause the actuator to rotate the axle 14, and thus the flap 12, to the stowed position shown in FIG. 2. In this stowed position, the flap 12 may be within the opening 22 of the frame 18, and is parallel, or substantially parallel, to the frame and/or aerodynamic surface 20.

When in the stowed position, the flap 12 may be substantially within the opening 22 and therefore present a low profile and minimal drag to the surface 20 of the associated aircraft or vehicle 21. In an alternate embodiment, as described previously, the SMA actuator 32 may be configured or composed to rotate the flap 12 clockwise to the stowed position when heated, and to rotate the flap counterclockwise to the deployed position when cooled. The configuration may depend upon the aerodynamic requirements of the vehicle 21. Thus, the actuator 32 may be attached to the axle 14 and to the rearward bearing 55 such that a change in temperature of the actuator may cause the actuator to rotate the flap 12 about the axle from a stowed position, wherein the flap is parallel to the frame 18, to a deployed position, wherein the flap is not parallel to the frame, and an opposite change in temperature of the actuator may cause the actuator to rotate the flap from the deployed position to the stowed position.

While the forms of apparatus and methods herein described constitute preferred embodiments of this invention, it is to be understood that the invention is not limited to these precise forms of apparatus and methods, and that changes may be made therein without departing from the scope of the invention.

What is claimed is:

1. A vortex generator comprising:
  a flap;
  a first bearing and a second bearing, each configured to be mounted on a surface;
  an axle rotatably retained in the first bearing and the second bearing, the flap fixed to the axle such that the flap rotates relative to the first bearing and the second bearing with the axle; and
  an actuator extending between the first bearing and the second bearing, the actuator made of a shape memory alloy fixed to the axle at a first end adjacent the first bearing, and fixed at a second, opposite end to the second bearing, the actuator having a central bore receiving the axle therein at the first end and at the second end, such that a change in temperature of the actuator causes the actuator to rotate the axle adjacent the first end relative to the first bearing and the second bearing, thereby rotating the flap relative to the first bearing and the second bearing.

2. The vortex generator of claim 1, wherein the actuator is configured to rotate the flap relative to the bearing from a stowed position, wherein the flap is parallel to the surface, to a deployed position, in which the flap is not parallel to the surface, in response to one of an increase in a temperature of the actuator and a decrease in the temperature of the actuator, and from the deployed position to the stowed position in response to one of a decrease in the temperature of the actuator and an increase in the temperature of the actuator, respectively.

3. The vortex generator of claim 1, wherein the flap includes a forward sleeve shaped to receive a forward portion of the axle, and a rearward sleeve shaped to receive a rearward portion of the axle.

4. The vortex generator of claim 3, wherein the actuator is configured to engage the forward sleeve such that rotational motion of the actuator is transmitted to the flap through the sleeve.

5. The vortex generator of claim 3, wherein the actuator and the forward sleeve are fixed to the forward portion of the axle such that rotational motion of the actuator is transmitted to the forward sleeve through the forward portion of the axle.

6. The vortex generator of claim 3, wherein the rearward sleeve is fixed to the rearward portion of the axle.

7. The vortex generator of claim 3, wherein the first bearing and the second bearing include a first journal bearing and a second journal bearing, respectively, and the actuator is attached to the second journal bearing.

8. The vortex generator of claim 7, further comprising a stop configured to prevent rotation of the flap past a preset position relative to the surface.

9. The vortex generator of claim 8, wherein the stop is formed by engagement of the forward sleeve with the first journal bearing.

10. The vortex generator of claim 9, wherein the stop includes a first bearing surface formed on the forward sleeve, and a second bearing surface formed on the bearing, such that engagement of the first bearing surface and second bearing surface prevents rotation of the flap past the preset position.

11. The vortex generator of claim 8, wherein the preset position positions the flap perpendicular to the surface.

12. The vortex generator of claim 8, wherein the actuator is configured to rotate the flap between a stowed position, in which the flap is parallel to the surface, and the preset position in response to an increase in temperature of the actuator from one of ambient temperature and a heating device, and to rotate the flap between the preset position to the stowed position in response to a decrease in temperature of the actuator.

13. The vortex generator of claim 1, wherein the actuator includes a sleeve having a central bore shaped to receive the axle therethrough.

14. The vortex generator of claim 13, wherein the first bearing and the second bearing include a forward bearing and a rearward bearing, respectively; and the rearward bearing is attached to the actuator.

15. The vortex generator of claim 14, wherein the actuator extends between the forward bearing and the rearward bearing.

16. The vortex generator of claim 15, wherein the forward bearing and the rearward bearing are journal bearings attached to the surface.

17. The vortex generator of claim 1, wherein the surface includes a frame adapted to be attached to a vehicle.

18. The vortex generator of claim 17, wherein the vehicle is one of an aircraft, a spacecraft, a land vehicle and a marine vehicle.

19. A vortex generator comprising:
a frame configured to be mounted on an aerodynamic surface;
a forward bearing mounted on the frame;
a rearward bearing mounted on the frame;
an axle rotatably attached to the forward and rearward bearings;
a flap having a leading edge and a trailing edge, the flap including a forward sleeve attached to the axle and a rearward sleeve attached to the axle such that the flap rotates with the axle relative to the forward and rearward bearings; and
an actuator extending between the forward bearing and the rearward bearing, the actuator made of a shape memory alloy and receiving the axle in a central bore of the actuator, the actuator being attached at a first end thereof to the axle adjacent the forward bearing, and at an opposite end thereof to the rearward bearing, such that a change in temperature of the actuator causes the actuator to rotate the axle, thereby rotating the flap from a stowed position, wherein the flap is parallel to the frame, to a deployed position, wherein the flap is not parallel to the frame, and an opposite change in temperature of the actuator causes the actuator to rotate the flap from the deployed position to the stowed position.

20. A method for deploying a vortex generator including a flap, the method comprising:
mounting a first bearing and a second bearing on an aerodynamic surface;
inserting an axle into the first bearing and into the second bearing and attaching the axle to the flap such that the flap rotates relative to the first bearing and to the second bearing with the axle;
placing an actuator made of a shape memory alloy between the first bearing and the second bearing, inserting the axle into a central bore of the actuator and attaching a first end of the actuator to the axle, and attaching a second end of the actuator to the second bearing; and
elevating the aerodynamic surface to an altitude wherein a temperature of the actuator decreases so that the actuator rotates the axle to rotate the flap to one of a parallel position relative to the aerodynamic surface and a non-parallel position relative to the aerodynamic surface.

* * * * *